Patented July 19, 1932

1,867,761

UNITED STATES PATENT OFFICE

ERICH RIETZ, OF WUPPERTAL-SONNBORN, GERMANY, ASSIGNOR TO I. G. FARBENINDUSTRIE AKTIENGESELLSCHAFT, OF FRANKFORT-ON-THE-MAIN, GERMANY

AGE IMPROVER

No Drawing. Application filed June 8, 1931, Serial No. 543,017, and in Germany June 12, 1930.

This invention relates to materials which have the property of improving rubber and retarding its deterioration due to age. The invention is also concerned with a new type of such materials, namely those which are obtainable by condensing ar-tetrahydro-alpha-naphthylamine with acetaldehyde, croton-aldehyde or aldol in the presence of a suitable acid and of a water soluble alcohol, and if desired, subsequently treating the reaction products with hot water.

The primary object of the invention is to provide new materials adapted to retard the deterioration of rubbers (which term is intended to include natural rubber and artificial rubber-like masses, obtainable, for example, by polymerization of butadiene-(1.3), isoprene, 2.3-dimethylbutadiene-(1.3) or other homologues or analogues of butadiene). Another object is to provide materials which will improve the resistance of rubber to deterioration due to age without causing an appreciable amount of discoloration of the rubber during vulcanization or thereafter.

The materials in question may be styled "age improvers" hereafter.

With a preferred embodiment in mind but without intention to limit the invention beyond that what may be required by the prior art, the invention briefly described consists in vulcanizing rubber in the presence of a product obtained by condensing ar-tetra-alpha-naphthylamine with acetaldehyde, croton-aldehyde or aldol in the presence of a suitable acid and of a water soluble alcohol, and, if desired, subsequently treating the reaction products with hot water.

The more detailed method of preparing the new age improvers may be by dissolving the reaction components, it means the acetaldehyde, aldol or croton-aldehyde and the ar-tetrahydro-alpha-naphthylamine in a water soluble alcohol, such as methyl-, ethyl-, isopropyl-alcohol or the like, adding a suitable organic or inorganic acid, such as hydrochloric acid, benzene sulfonic acid, formic acid, acetic acid, butyric acid, crotonic acid, phenylacetic acid, benzoic acid and the like, and heating the reaction mixture, preferably to boiling, until no more of the reaction product being formed separates.

The amount of acid to be applied may vary within rather wide limits. Generally, rather small amounts, say between ½ to 3% by weight (calculated on the ar-tetrahydro-alpha-naphthylamine employed) will yield the best results, but also considerably larger amounts will be operative in many cases.

The resinous masses thus obtainable are freed from the alcohol-acid mixture, for example, by siphoning off and washing the residue with alcohol. Advantageously, the new products are in addition treated with hot water, whereby they change to a powdery mass, which is filtered by suction, washed with water and alcohol and then dried. Light yellow, odorless, extremely finely divided powders of rather high melting points are thus obtained, which are nearly insoluble in alcohol. Compared with the known condensation products of aliphatic aldehydes with bases of the naphthalene series, the new products have, when aftertreated with hot water, the advantage that in consequence of their powder form, they can more easily and more homogeneously be rolled or kneaded into rubber goods. A further advantage of the new products, as well in the resin-like as in the powdery form, is that they are odorless and in consequence do not lend any unpleasant odor to the rubber goods, to which they are added, and that these goods are stable to light.

Likewise, vulcanization accelerators are not influenced in their efficacy by the new age improvers in any way.

It may be mentioned that it is not necessary to start from the pure aldehydes specified, but that also mixtures of the same, such as technical aldol, containing aldol and acetaldehyde, yield odorless products of pronounced anti-oxidant action. Also it is not necessary to start with equal molecular quantities of the reaction components, but the best results are generally obtained, when using one molecular weight of the aldehyde for each molecular weight of the ar-tetrahydro-alpha-naphthylamine.

The following example will illustrate the efficacy of the new age retarders, the parts being by weight:—

*Example*

100 parts of smoked sheets are mixed by rolling with
33 parts of zinc oxide (highly active)
1 part of diphenylguanidine
3.75 parts of sulfur
15 parts of titaniumdioxide
1.5 parts of age improver = the condensation product of aldol with ar-tetrahydro-alpha-naphthylamine in the powdery form as described above.

Vulcanization was performed at a steam pressure of 3½ atm. (above atmospheric) for 35 and 45 minutes. The ageing tests with the vulcanizates thus obtained were performed by heating the vulcanizates in a Geer oven to 70° C. Two days of this heat treatment in the Geer oven correspond to a natural ageing of one year.

| Artificial ageing corresponding to years | Tensile strength in kg. per. sq. cm. | | | |
| --- | --- | --- | --- | --- |
| | Without age-improver time of vulc. | | With aldol-tetrahydro-alpha-naphthylamine time of vulcanization | |
| | 35 min. | 45 min. | 35 min. | 45 min. |
| 0 | 239 | 241 | 220 | 192 |
| 3.5 | 132 | (63) | 210 | 150 |
| 5 | 102 | 63 | 185 | 150 |

I claim:—

1. A method of treating rubber which comprises adding to a vulcanizable rubber composition a material obtained by heating ar-tetrahydro-alpha-naphthylamine with a compound of the group consisting of acetaldehyde, croton-aldehyde and aldol in the presence of a small amount of an acid and of a water soluble alcohol, and vulcanizing the rubber.

2. A method of treating rubber which comprises adding to a vulcanizable rubber composition a material obtained by heating ar-tetrahydro-alpha-naphthylamine with a compound of the group consisting of acetaldehyde, croton-aldehyde and aldol in the presence of a small amount of an acid and of a water soluble alcohol and aftertreating the reaction product with hot water, and vulcanizing the rubber.

3. As a new product rubber, vulcanized in the presence of a material obtained by heating ar-tetrahydro-alpha-naphthylamine with a compound of the group consisting of acetaldehyde, croton-aldehyde and aldol in the presence of a small amount of an acid and of a water soluble alcohol.

4. As a new product rubber vulcanized in the presence of a material obtained by heating ar-tetrahydro-alpha-naphthylamine with a compound of the group consisting of acetaldehyde, croton-aldehyde and aldol in the presence of a small amount of an acid and of a water soluble alcohol and aftertreating the reaction product with hot water.

5. Age improver consisting of a compound obtained by heating ar-tetrahydro-alpha-naphthylamine with a compound of the group consisting of acetaldehyde, croton-aldehyde and aldol in the presence of a small amount of an acid and of a water soluble alcohol.

6. Age improver consisting of a compound obtained by heating ar-tetrahydro-alpha-naphthylamine with a compound of the group consisting of acetaldehyde, croton-aldehyde and aldol in the presence of a small amount of an acid and of a water soluble alcohol and aftertreating the reaction product with hot water.

In testimony whereof, I affix my signature.

ERICH RIETZ.